US007207462B2

(12) United States Patent
Gunderson et al.

(10) Patent No.: US 7,207,462 B2
(45) Date of Patent: Apr. 24, 2007

(54) LID DISPENSER

(75) Inventors: Jeffrey E. Gunderson, Stoughton, WI (US); William R. Laupan, Madison, WI (US)

(73) Assignee: Acry Fab, Inc., Sun Prairie, WI (US)

( * ) Notice: Subject to any disclaimer, the term of this patent is extended or adjusted under 35 U.S.C. 154(b) by 0 days.

(21) Appl. No.: 11/238,789

(22) Filed: Sep. 29, 2005

(65) Prior Publication Data

US 2007/0068962 A1 Mar. 29, 2007

(51) Int. Cl.

*G07F 11/16* (2006.01)
*B65H 3/28* (2006.01)
*A01C 9/00* (2006.01)
*B23Q 7/04* (2006.01)

(52) U.S. Cl. ...................... 221/220; 221/223; 221/222; 221/24; 221/221

(58) Field of Classification Search ................ 221/228, 221/229, 232, 47, 210, 223, 289, 255, 414, 221/795.6, 796.9, 276; 312/71, 42

See application file for complete search history.

(56) References Cited

U.S. PATENT DOCUMENTS 3,163,323 A 12/1964 Behrens et al.
3,540,130 A 11/1970 French
3,565,284 A * 2/1971 Hinterreiter ............... 221/229
4,234,101 A 11/1980 Pastore
4,740,024 A * 4/1988 Hultquist .................... 294/116
4,804,108 A 2/1989 Ficken
4,854,479 A 8/1989 Callahan et al.
5,012,952 A 5/1991 Franz
5,071,033 A * 12/1991 Siwek ........................ 221/229
5,135,136 A 8/1992 Moone
5,191,996 A * 3/1993 Jenkins ........................ 221/64
5,383,571 A * 1/1995 Gunderson .................. 221/223
5,960,989 A * 10/1999 Gunderson .................. 221/220

(Continued)

OTHER PUBLICATIONS

"REDI-LID Sanitary Lid Dispenser" http://logicorllc.com/HTML/RediLid.html web page, printout Apr. 3, 2006.

(Continued)

*Primary Examiner*—Gene O. Crawford
*Assistant Examiner*—Rakesh Kumar
(74) *Attorney, Agent, or Firm*—Stiennon & Stiennon

(57) ABSTRACT

A dispenser is adjustable to contain beverage container lids of various sizes. A housing has a front element with an opening. Pager assemblies are mounted in slots which extend radially outwardly from the opening. A stack of lids is inserted into the housing through the opening, and the pager assemblies allow a single lid to be extracted from the stack by the pivoting of a door containing two claws which engage the frontmost lid. To reconfigure the dispenser for a different lid size, a template is positioned frontwardly of the housing front element, and the pager assemblies are adjusted to abut the template, thereby configuring the pager assemblies in the proper position. The claws on the lid are then replaced with claws which are configured to the new lid shape.

12 Claims, 7 Drawing Sheets

U.S. PATENT DOCUMENTS

| | | | | |
|---|---|---|---|---|
| 6,113,345 | A * | 9/2000 | Ashby | 414/801 |
| 6,357,624 | B1 | 3/2002 | Brown | |
| 6,425,495 | B1 * | 7/2002 | Senda et al. | 221/24 |
| 6,474,503 | B2 * | 11/2002 | Davis | 221/223 |
| 6,543,639 | B1 * | 4/2003 | Kovens | 221/24 |
| 6,659,305 | B2 * | 12/2003 | Thompson | 221/223 |
| 6,966,454 | B2 * | 11/2005 | Kawolics et al. | 221/241 |
| 2005/0194397 | A1 | 9/2005 | Hecht | |

OTHER PUBLICATIONS

Photographs of prior art LIDSAVER® lid dispenser door assembly, sold by Acry Fab, Inc., Sun Prairie, WI, prior to Sep. 29, 2005.

Photographs of Test Unit lid dispenser, placed in test locations by Acry Fab, Inc., Sun Prairie, WI, prior to Sep. 29, 2005.

* cited by examiner

LID DISPENSER

BACKGROUND OF THE INVENTION

The present invention relates to dispensers in general, and to devices for dispensing food service lids in particular.

In many convenience stores, restaurants, cafeterias, and other locations where beverages are sold, customers are allowed to serve themselves from beverage dispensers. The beverages are dispensed into disposable cups. To limit spilling of the beverages, especially for take-out orders, the cups are commonly sealed by the customer with a disposable plastic lid.

For reasons of convenience, efficiency, reduced waste, and improved hygiene, the beverage container lids are optimally dispensed from a lid dispenser which makes available a single lid while protecting the remaining supply of lids from contact with the customer. In U.S. Pat. Nos. 5,960,989 and 5,383,571, the disclosures of which are incorporated by reference herein, lid dispensers are described which readily dispense single lids for consumer use. These lid dispensers are configured for ready adjustment to accommodate the wide variety of lid shapes and sizes found in the marketplace, in some cases without the use of tools.

However, lid dispensers which universally accommodate different types of lids will typically be more complex in structure, and hence more costly. Yet in most situations, a particular lid dispensing installation will remain configured for a particular type of lid for an extended length of time, and will only rarely be required to be changed. What is needed is a lid dispenser which is configurable by the manufacturer to dispense a particular lid, yet which is readily reconfigured by the unskilled field operator to accommodate a different type of lid when the situation requires.

SUMMARY OF THE INVENTION

A dispenser is adjustable to contain beverage container lids of various sizes. A housing has a front element with an opening. Pager assemblies are mounted in slots which extend radially outwardly from the opening. A stack of lids is inserted into the housing through the opening, and the pager assemblies allow a single lid to be extracted from the stack by the pivoting of a door containing two pivotably mounted claws which engage the frontmost lid. To reconfigure the dispenser for a different lid size, a template is positioned frontwardly of the housing front element, and the pager assemblies are adjusted to abut the template, thereby configuring the pager assemblies in the proper position. The claws on the lid are then replaced with claws which are configured to the new lid shape.

It is an object of the invention to provide a lid dispenser which repeatedly dispenses individual container lids.

It is an additional object of the present invention to provide a lid dispenser which can be readily reconfigured to dispense different size lids.

It is also an object of the present invention to provide a method for readily designing elements which can be attached to a remote lid dispenser to configure that dispenser to a particular lid shape.

Further objects, features and advantages of the invention will be apparent from the following detailed description when taken in conjunction with the accompanying drawings.

DESCRIPTION OF THE PREFERRED EMBODIMENTS

Figure 1:
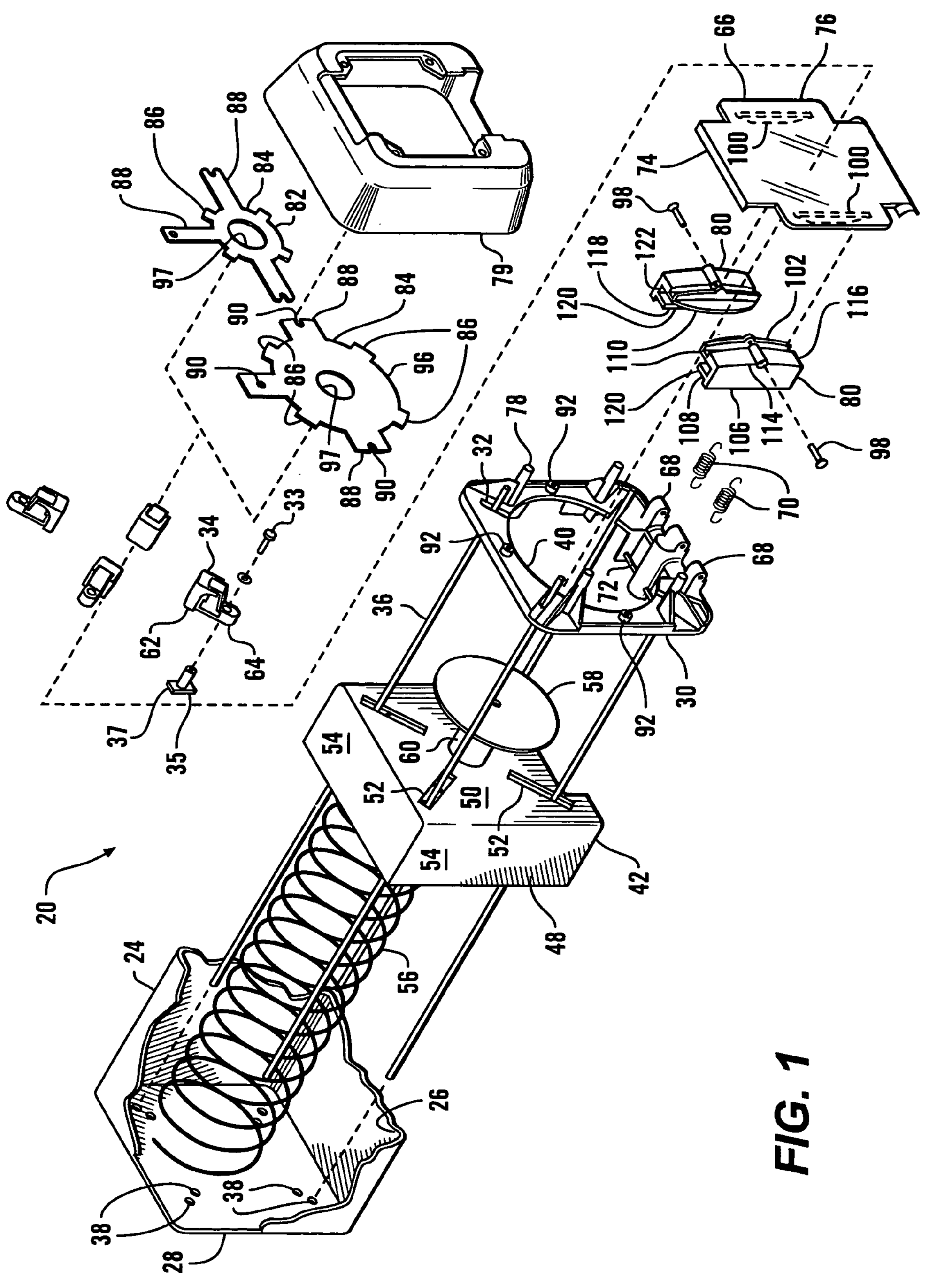
FIG. 1 is an exploded isometric view of the dispenser and two adjustment templates of this invention.

Referring more particularly to FIGS. 1–10, wherein like numbers refer to similar parts, a dispenser 20 of beverage container lids is shown in FIG. 1. The dispenser 20 has a tubular housing 24 which has an interior compartment 26 defined between a rear wall 28 and a front element 30. The front element 30 has four radially extending slots 32 which each receive an adjustable pager assembly 34. The slots 32 extend radially outwardly from a generally circular dispensing opening 40 which provides an outlet from the housing interior compartment 26. Each pager assembly 34 is positionable along a radial slot 32 and is fixed in place by a screw fastener 33 which engages with a threaded retainer 35 with a flange 37 which abuts against the rear of the front element 30. The screw fasteners 33 may be security screws to prevent tampering such as the TORX PLUS® fastener with a central solid post and five lobe design made by Textron Industries, Inc. Each pager assembly has an axially extending rod 36 which extends through the interior compartment 26 to be received within a rod hole 38 formed in the rear wall 28. The rear wall 28 is preferably provided with two pre-drilled rod holes for each rod. The rod holes are positioned radially outwardly one from the other such that the four rods 36 may be more closely positioned when engaged within the radially inward holes, or may be more distantly spaced when engaged within the radially outward holes.

Figure 4:
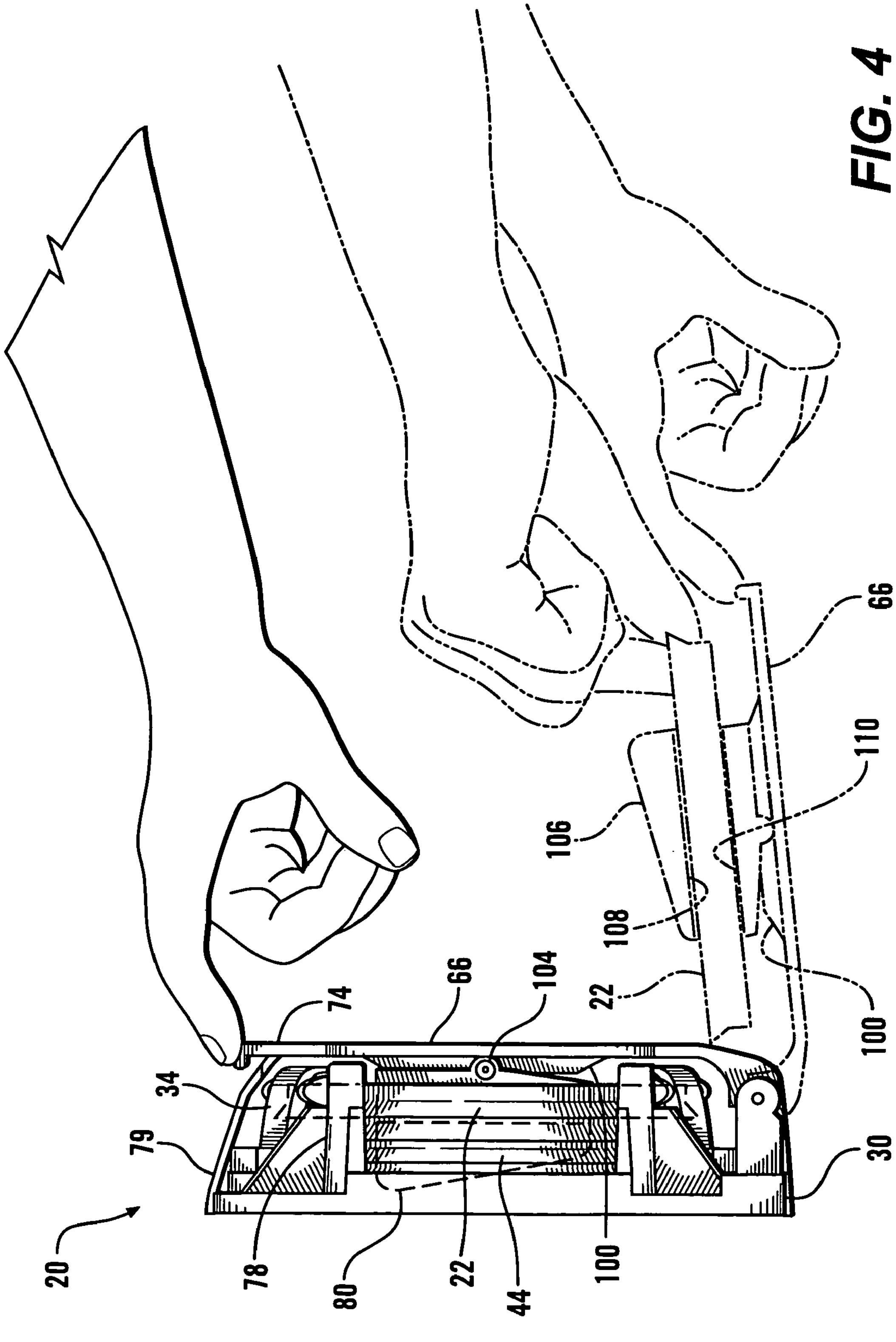
FIG. 4 is a side elevational view of the dispenser of FIG. 1 showing the dispensing door being grasped by a user, and showing in phantom view the opened dispensing door and the dispensed lid made available to the user.

A piston assembly 42 is mounted within the compartment 26 to travel axially within the compartment 26 and to urge a stack 44 of lids 22, shown in FIG. 4, towards the dispensing opening 40. The piston assembly 42 has a body 48 with a forward wall 50 having four radially extending slots 52 formed therein. The rods 36 extend through the slots 52. The piston assembly body 48 has three rearwardly extending side walls 54 which restrict the tipping of the body, with the result that the body travels axially along the rods 36. A coil spring 56 extends between the rear wall 28 and the forward wall 50 of the body 48, and urges the body towards the dispensing opening 40. A circular nose plate 58 is fixed to a narrow diameter standoff member 60 which is fixed to the forward wall 50 of the body 48.

The dispenser 20 is loaded with a stack 44 of lids 22 by introducing the stack through the dispensing opening 40 in the front element 30. The four pager assemblies 34 each have a flipper 62 which is pinned to a pager body 64, and is urged into a forward orientation by a spring (not shown). Each flipper has a rearwardly facing resilient strip 67, shown in FIG. 6, which engages the lid. The resilience of the strip may vary to best suit a particular lid, for example a 45 durometer Shore A thermoplastic rubber element. Other materials of different hardness may be employed where appropriate. The flippers 62 extend outward over the dispensing opening 40, but are pressed out of the way to allow the stack 44 to enter the housing compartment 26. The stack of lids also depresses the piston assembly 42.

A dispensing door 66 is pivotably mounted to two ears 68 which protrude frontwardly from the front element 30. The dispensing door 66 is urged into a closed position by two springs 70 which extend between a horizontal rod 72 which is fixed to the door 66 and portions of the front element 30. The dispensing door 66 is preferably formed of transparent plastic material to allow the lids 22 to be viewed through the door when it is closed. The door 66 has an upwardly extending handle portion 74 which is gripped by a user when it is desired to extract a single lid. The door 66 has a middle portion 76 which is generally planar, and which abuts against portions of the front element 30 when the door is closed. The front element 30 has four studs 78 which project frontwardly. A molded plastic housing extension 79 is screwed to the four studs 78. The housing extension 79 prevents access to the interior of the dispenser 20 when the door 66 is closed. The studs 78 position the housing extension 79 against which the closed door abuts, and thereby hold the door when closed such that the door middle portion 76 is approximately parallel to the frontmost lid 22 within the stack 44.

Two claws 80 are pivotably mounted to the dispensing door 66. The claws are mounted about pivot axes defined by screw fasteners 98. The pivot axes are coaxial. The claws 80 are spaced on opposite sides of the frontmost lid 22. As shown in FIG. 4, when the door 66 is closed on the housing, portions of the claws 80 engage the frontmost lid 22. When the lid is pivoted frontwardly the engaged lid 22 is pulled free of the pager flippers 62. The separated lid 22 is then presented to the user retained on the door 66 between the claws. When the user releases the door 66, after removing the dispensed lid, the springs 70 return the door to its closed position with the claws engaged behind the new frontmost lid, and the device is now ready to dispense another lid.

In order to effectively and repeatably dispense individual lids 22, the pager assemblies must be in the correct position with respect to the stack of lids, and the claws must properly engage the lids. It will be understood that in most situations, the dispenser 20 will be used to dispense the same size and model of container lid for an extended period of time. However, from time to time, due to a reconfiguration of a facility, or a change in vendor or lid model, it will be necessary to adapt a dispenser 20 to dispense a different lid 22. The dispenser 20 is adjusted for a new type of lid by making three changes: 1) positioning the pager assemblies 34 at the correct radial positions; 2) replacing the circular nose plate 58 with one of the correct radius; and 3) replacing the two pivotable claws 80 with ones designed to engage the new lid.

The owner of a particular dispenser will typically not have on hand the necessary replacement parts to make a change to accommodate a different lid. Thus, when it is desired to change the lid dispensed in a particular dispenser, the owner communicates with the manufacturer, indicating the type of lid, hereinafter "the new type lid" which it is desired to dispense. The manufacturer then supplies to the owner an adjustment kit to enable the dispenser to be reconfigured for the new type lid. The adjustment kit comprises a template 82, a nose plate 58, and two claws 80. There are two possibilities: either the new type lid is of a type for which the manufacturer has already designed an adjustment kit, or the new type lid is of a type for which the manufacturer has not previously designed an adjustment kit. In either event, the manufacturer prepares an adjustment kit as needed and supplies it to the owner. The guidelines used by the manufacturer in designing an adjustment kit are described in more detail below.

Figures 2, 3:
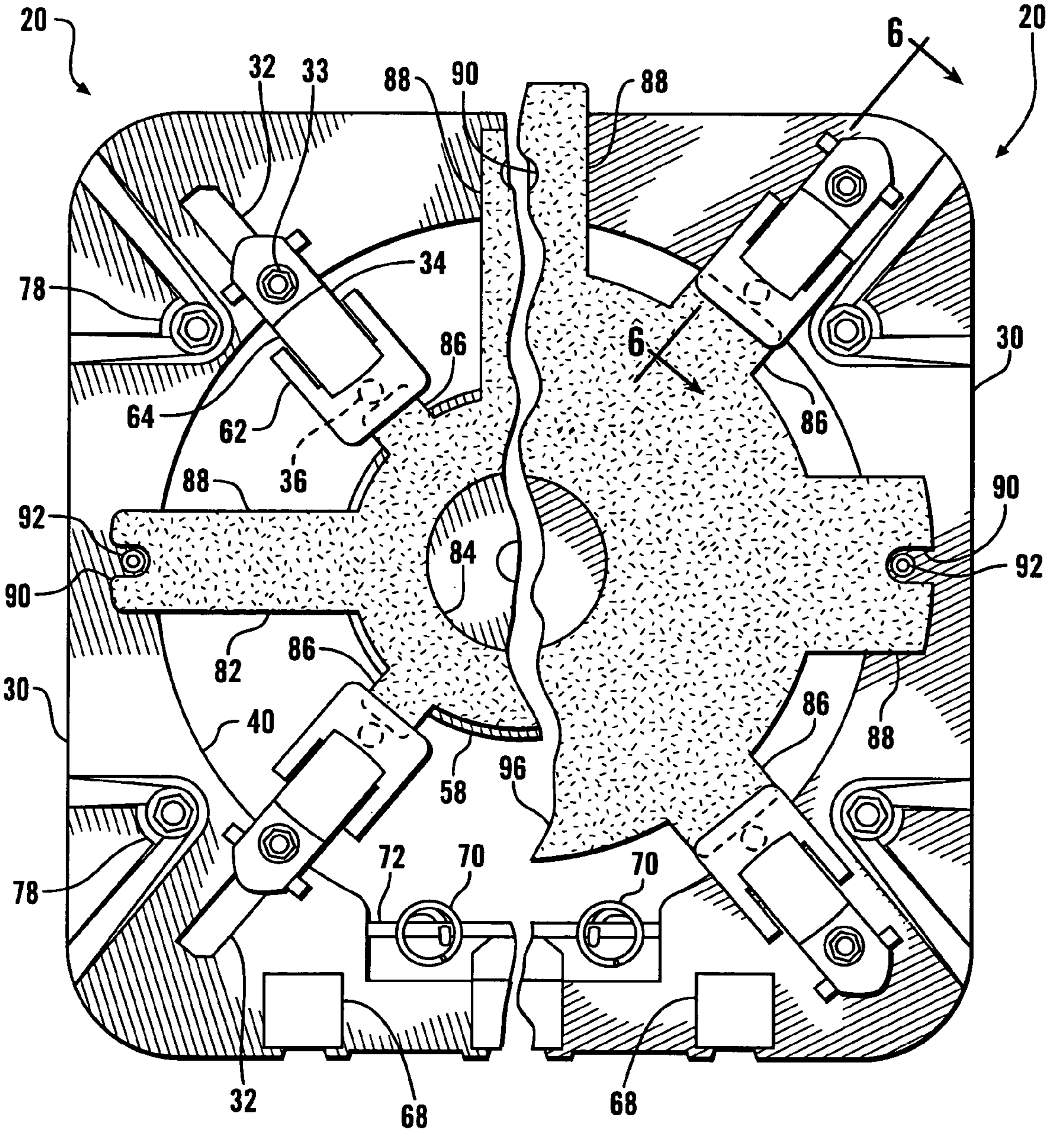
FIG. 2 is a front elevational view of the dispenser of FIG. 1 with a pager adjustment template in place.
FIG. 3 is a fragmentary front elevational view of the dispenser of FIG. 1 with a larger pager adjustment template in place.

Once the owner has the adjustment kit in hand, the dispenser may be modified to dispense the new type lid. To adjust the positions of the pager assemblies 34, the housing extension 79 is removed from its attachment to the studs 78 by removing the screws which attach it thereto (not shown). Then the fasteners 33 which hold the pager assemblies in the slots 32 are loosened, and the pager assemblies 34 are moved to their farthest radially outward position. Next a stiff pager assembly template 82 is positioned adjacent the housing front element 30, as shown in FIG. 2. The template 82 may be fabricated from any suitably rigid material, such as acrylic sheet 0.090 up to ⅜ inches thick, for example $\frac{3}{16}$ inches thick. The template 82 has a ring-like body 84, with four tabs 86 which project radially outwardly to serve as rod set portions. The template 82 also has three positioning arms 88 which extend radially outwardly and which have cut-aways or apertures 90 which engage with alignment elements 92 on the front element 30. The alignment elements 92 may be any fixed portions of the front element, such as molded circular protrusions, as shown in FIG. 2. The circular protrusions 92 preferably include one that is above the dispensing opening, and one on either side of the dispensing opening 40. The positioning arms 88 with the cut-aways or apertures 90 serve as alignment structures which effectively position the tabs 86 of the template with respect to the front element 30. With the template held in position, the pager assemblies 34 are moved inwardly in the slots 32 until the rods 36 abut the tabs 86, as shown in FIG. 2. It should be noted that the rod set portions could also be configured to abut against portions of the pager assembly to which a rod is connected, rather than directly against a rod. Depending on the size of the new type lid, the template will cause the pager assemblies to be nearer, as in FIG. 2, or farther, as in FIG. 3, from the center of the template. FIG. 3 shows an alternate template 96 for a larger lid. The templates preferably have a central hole 97 to facilitate removal.

In addition to adjusting the position of the pager assemblies 34, the nose plate 58 may be removed from the standoff member 60 by removing a central screw fastener, and a new nose plate 58 of the correct diameter may be attached to the standoff member 60. Once the pager assemblies 34 and nose plate are in position, the housing extension 79 may be reattached.

The two old claws 80 are removed by unscrewing nylon screw fasteners 98, shown in FIG. 1, which connect the claws 80 to rearwardly protruding ears 100 on the dispensing door 66. The new claws 80 are then fastened in place. Each claw 80 has two frontwardly protruding ears 102 with threaded holes 104 therein. Each dispensing door ear 100 has an unthreaded opening through which the threaded fasteners 98 extend to permit the claws 80 to pivot with respect to the dispensing door 66. Depending on the size of the new type lids, it may also be necessary to move the rear ends of the rods 36 to different rod holes 38 in the rear wall 28 of the housing.

Once the pager assembly positions have been adjusted (and the rods repositioned if necessary), and the new claws 80 and the nose plate substituted for the old ones, the dispenser may be returned to service for dispensing the new type lids. The dispenser 20 of this invention thus allows the manufacturer to conduct the necessary research into how best to configure the dispenser for a particular lid, leaving simple mechanical procedures to the owner to reconfigure a particular dispenser. The fact that disposable container lids usually must be produced with very little variation in order to effectively mate with a disposable container contributes to the repeatable performance of the dispenser.

Figure 5:
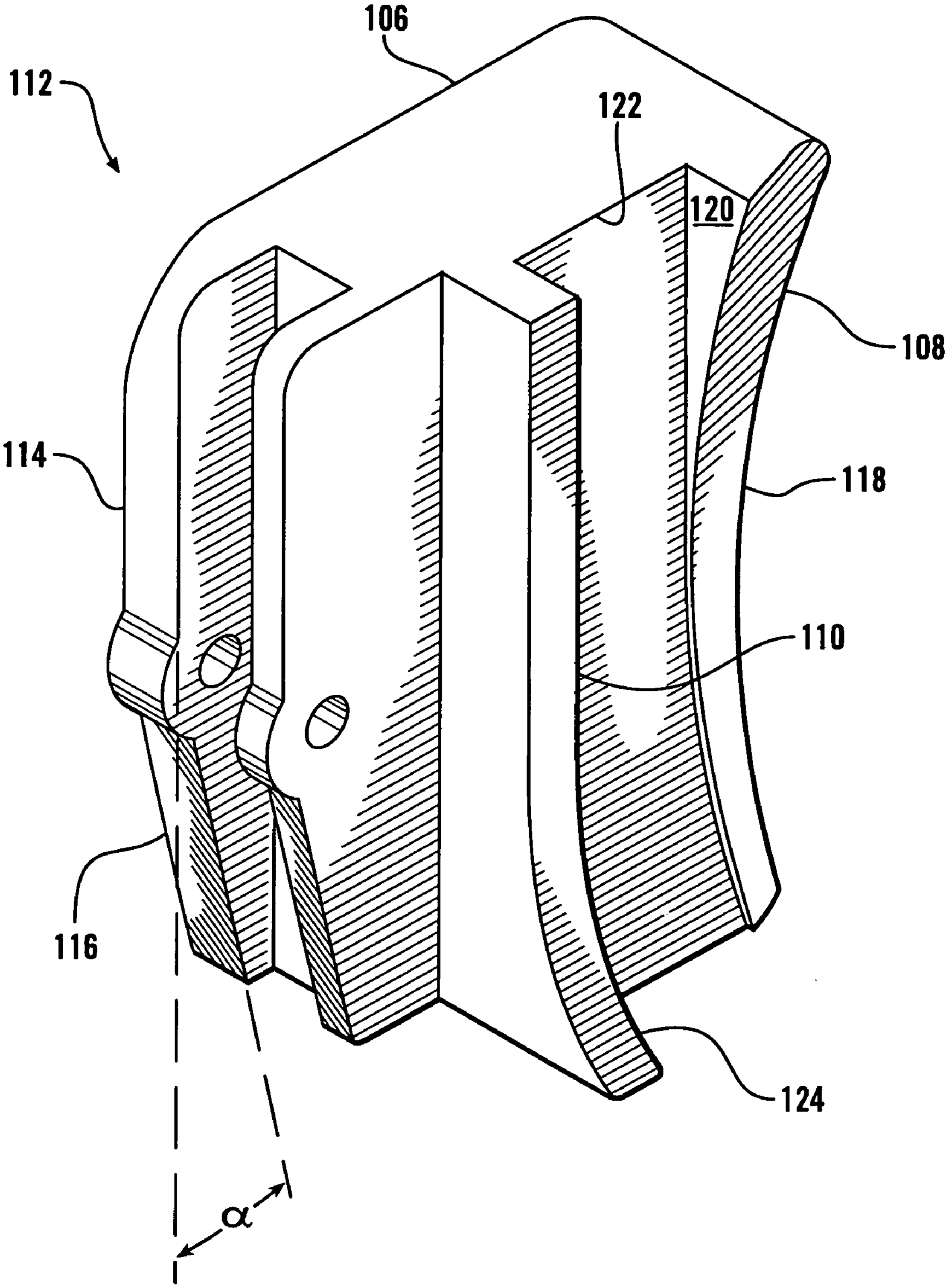
FIG. 5 is an isometric view of a single claw for use with the dispenser of FIG. 1.

In designing the claws 80, the manufacturer has two main types of claw: a claw 80 such as shown in FIGS. 1 and 4 which is suited for a flat lid; and a claw 112, such as shown in FIG. 5, which is suited for a domed lid.

Figure 7:
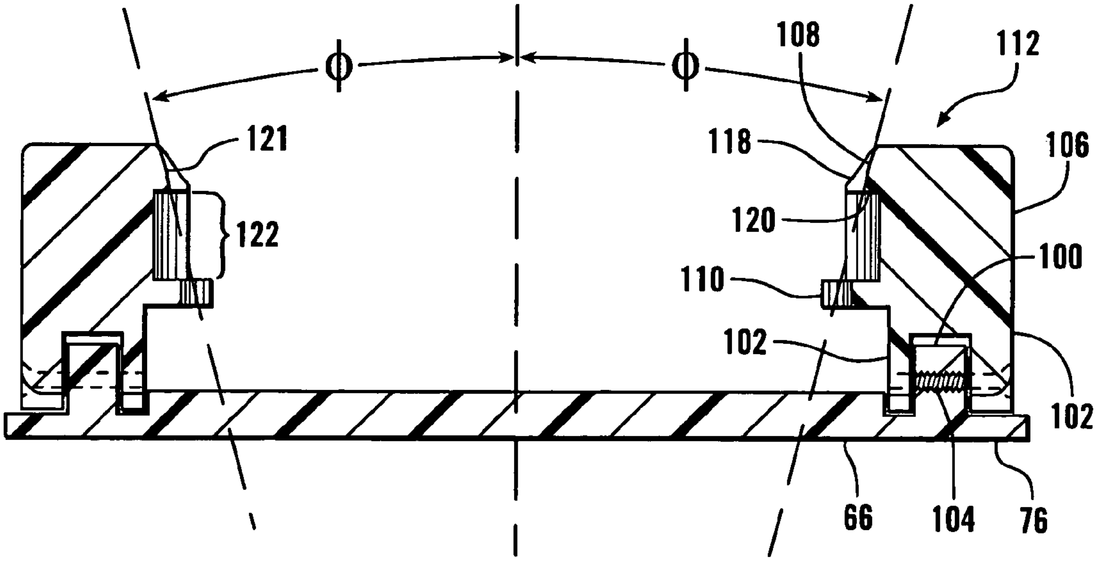
FIG. 7 is a fragmentary cross-sectional view of the dispensing door and claws of the dispenser of FIG. 1.

The claw 80 for a flat lid has a claw body 106 with a radially inwardly protruding rear lip 108 which engages rearwardly of a lid 22. A depth stop 110 also protrudes radially inwardly from the claw body 106 and is spaced frontwardly and parallel to the rear lip 108. The claw ears 102 have an upper edge 114 which extends generally parallel to the depth stop 110 and to the dispensing door 66 when the door is closed. The lower edge 116 of the claw edge, however, extends rearwardly at an angle $\alpha$ with respect to the upper edge of from about 5° to about 25°, thereby permitting pivoting of the claws by about 5° to about 25°. This relief of the lower edge permits claws 80 to pivot with respect to the dispensing door 66 as the door is opened, and to remain substantially parallel to the lids as the door is opened until an inclination of angle $\alpha$ is reached. As shown in FIG. 7, the rear lip 108 has a rear edge 118 which is the first to engage the lid as the dispensing door is closed on the stack of lids, and a claw surface 120 which is positioned frontwardly of the rear edge and which is parallel to the depth stop 110. Portions of a generally conical surface 121 are defined on the rear lip 108 which extends between the rear edge 118 and the claw surface 120. This conical surface, as shown in FIG. 7, is preferably a surface defined by a cone having a center axis 123 which is positioned on a horizontal plane which is parallel to the axis 127 of the lid stack, and having a cone angle of $\phi$, which is preferably about 15° to 35°. The cone angle may vary as it extends around the lid.

The claws operate as follows to provide repeatable dispensing of individual lids. After a lid has been dispensed, or after the unit has been loaded with a fresh stack of lids, the dispensing door 66 is closed on the stack. When the door 66 closes, the depth stops 110 of the claws 80 engage against the foremost lid and depress the entire stack, thereby resetting the stack to a known position. The claw surfaces 120 of the claws are then engaged behind the flange of the frontmost lid. When the next user seeks to dispense a lid, the door 66 is pivoted frontwardly, causing the claws to move frontwardly and pull the frontmost lid forward. Because of the pivotal mounting of the claws, they will remain parallel to the frontmost lid until the door 66 is opened so far that the claws can pivot no more. Because the claws are able to pivot, the claws are able to remain generally parallel to the lids over a longer portion of the door travel, and this helps to evenly remove the frontmost lid from the pagers.

Figure 8:
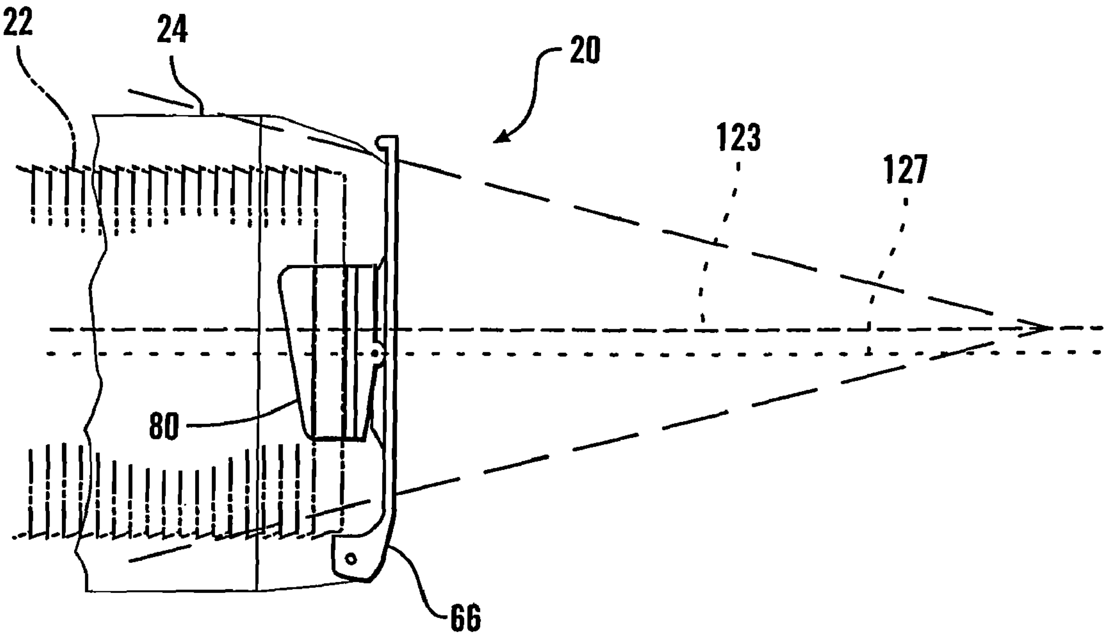
FIG. 8 is a schematic side cross-sectional view of the apparatus of FIG. 4 showing the axis of the conical surface defined by the claws being above the axis of the lid stack when the door is closed on the housing.
Figure 9:
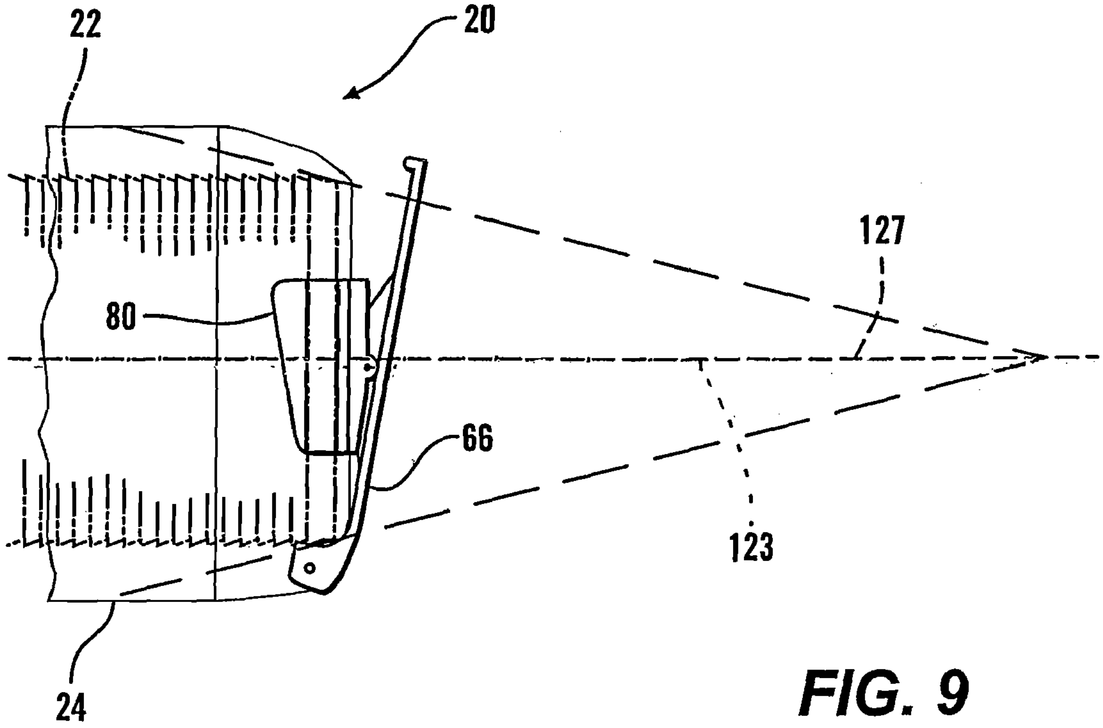
FIG. 9 is a schematic side cross-sectional view of the apparatus of FIG. 8 showing the axis of the conical surface defined by the claws being aligned with the axis of the lid stack when the door is partially opened.

As shown in FIGS. 8 and 9, the rear lip surfaces 121 which define portions of a cone, are configured such that when the door 66 is closed on the housing 24, the axis 123 of the cone is above the axis 127 of the lid stack 44 by from about a few thousandths of an inch to a quarter of an inch, depending on the thickness of the lid. A thicker lid will require a greater offset. The pivot axes of the claws on the door serve as a reference point, and correspond in a door closed position to an axis which lies on a plane passing through the lid stack axis 127.

Figure 6:
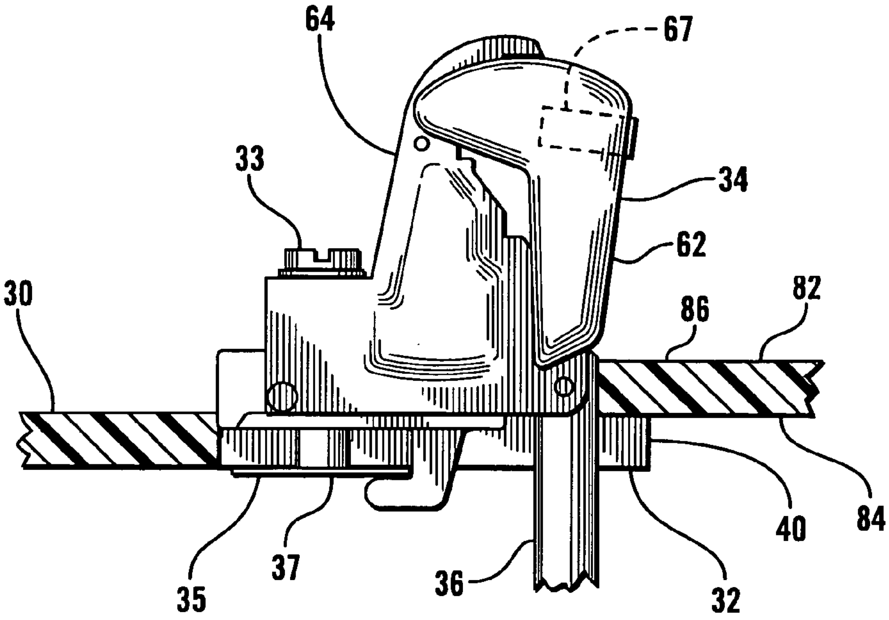
FIG. 6 is a fragmentary cross-sectional view of the dispenser of FIG. 3 taken along section line 6—6.

As shown in FIG. 9, the axes 123, 127 ideally line up as the door opens, and the rim of the lid which is about to be removed hits the resilient blocks 67, shown in FIG. 6, in the pager assemblies 34. It is at this point that it is desirable for the conical surfaces of the claws and exteriors of the lids to be aligned, when the lid flanges engage near the center of the blocks 67 in side view. As this is a high friction area, as the lid comes forward, there is a reaction force from the lid, and this is where the lid disengages from the stack, a point at which maximum alignment is desired. The claws separate the frontmost lid from the stack, while the remainder of the stack is restrained against the pager flippers 62. As the door is fully opened as shown in FIG. 4, the lid is presented for convenient removal from the door by the patron.

Another important dimension is the depth of the gap 122 between the claw surface 120 and the depth stop 110. As a rule of thumb, the gap 122 should have a depth in the direction of the axis of the lid stack of the thickness of the lid plus approximately 0.030 inches. This dimension can vary depending on the design of the specific lid flange. If the gap is too large, there is the possibility of dispensing more than one lid at a time. If the gap is too small, there will be no dispensing at all. However, there are certain lids in which the lid, for whatever reason, is compressible, and the gap should then be somewhat less than the thickness of the lid by as much as 0.030 inches. In any event through a process of trial and error, guided by these general considerations the manufacturer will design claws which adequately dispense a particular lid. Preferably the design will be rendered in a CAD format, which will then allow individual molds to be prepared for low quantity output. The templates may be fabricated from sheet material in response to a CAD file which is used to drive a laser cutter or other fabrication device. It will be noted that the two claws are substantially mirror images of one another.

The claws may be designed using a modeling software application, and the design will be based on measurements of the lid as well as experience. Then a stereolithographic model of the design is printed out. If necessary, the model may be sanded and filed until desired performance is achieved. Then a silicone rubber mold is made of the sanded stereolithographic model, and the final claw is cast in the mold, using epoxy, acrylic or polyurethane resin. Polyurethane is a desirable resin because of the small amount of shrinkage. The molds may then be retained on hand by the manufacturer to permit ready production of additional sets of claws for the same lid when requested by other customers. A turn-around time of 24 hours can be obtained once the mold is on hand. Usually a turn-around time of 96 hours to a week and half will be required to design a kit for a new lid. For claws required in larger quantities an injection molding mold can be prepared directly from the modeling software numerical model.

The claw 112 for a domed lid, as shown in FIGS. 5 and 7, is similar to the claw for a flat lid, except that the depth stop 110, instead of being a concave half-oval, is concave, with a generally J-shaped interior contour 124.

Figure 10:
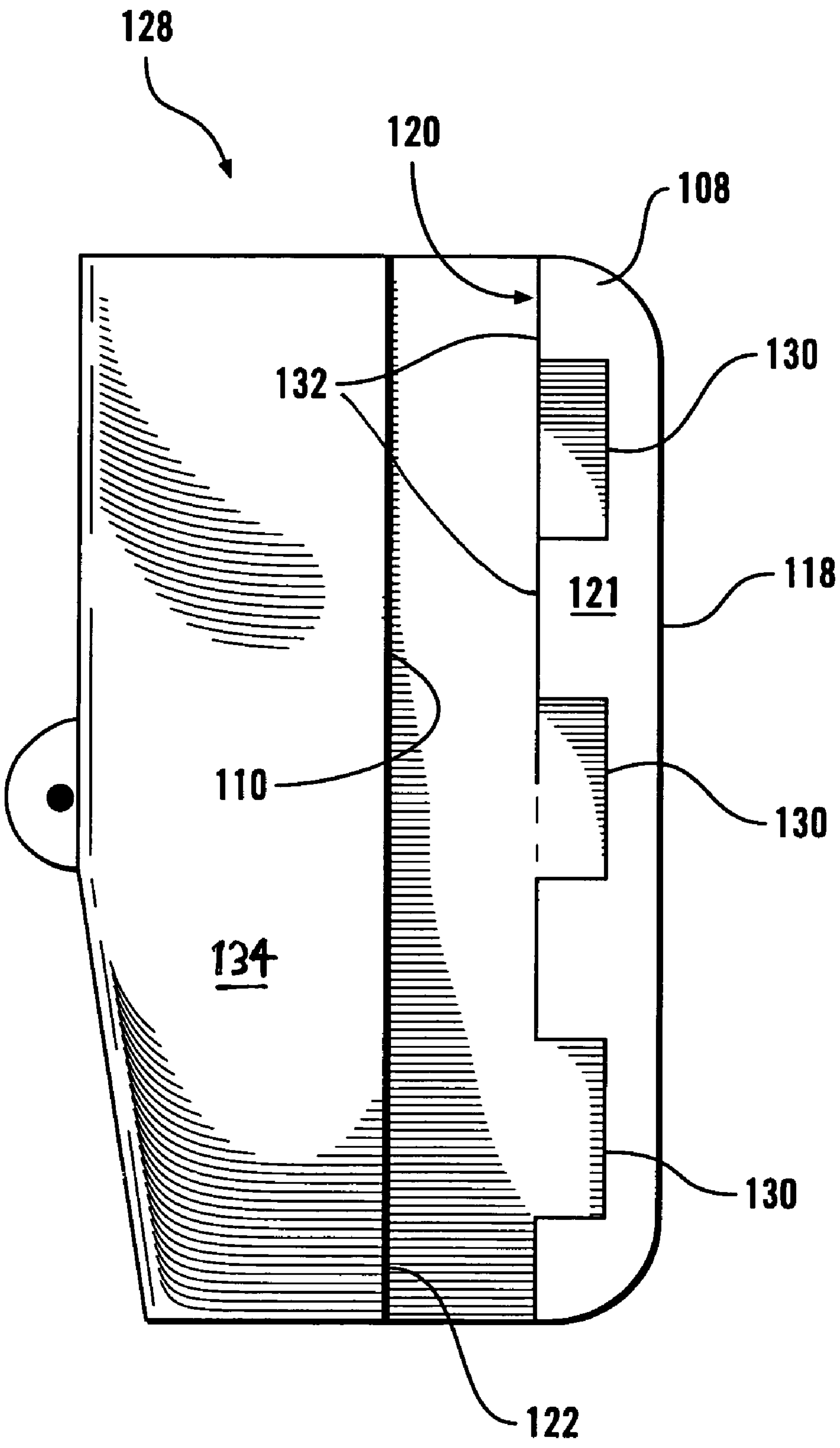
FIG. 10 is a side elevational view of an alternative embodiment claw having a relieved engagement surface.

An alternative embodiment claw 128 is shown in FIG. 10. The claw 128 is generally similar to the claw 112, shown in FIG. 5, but the rear lip 108 which extends from the rear edge 118, is broken by a series of relieved cut-aways 130, where the conical surface is relieved. The claw surface 120 thus has a serrated appearance. Thus portions of the claw define a generally conical surface 121 on the rear lip 108 which are interrupted by the cut-aways 130. The cut-aways 130 can contribute to the repeatable engagement of lids from the stack. The cut-aways may, for example, divide the surface 121 into four spaced portions or lands 132, however, it should be noted that a different number of cut-aways and lands may be used, having one or more relieved cut-aways. The illustrate claw intended for use with domed lids. The surface 134 extending frontwardly from the gap 122 may be somewhat spherical to accommodate a domed lid. Similar claws for flat lids could be constructed with a depth stop as shown in FIG. 1. The spacing, depth, location, radiusing, and shape of the relief sections may be varied to suit a particular lid.

It is understood that the invention is not limited to the particular construction and arrangement of parts herein illustrated and described, but embraces all such modified forms thereof as come within the scope of the following claims.

We claim:

1. A lid dispenser comprising:

a housing having a front element with an opening therein through which lids are dispensed;

a plurality of pagers mounted to the housing to project frontwardly of the front element and to engage lids presented at the housing opening;

a door positioned frontwardly of the front element, and pivotably mounted to the housing;

a first claw mounted to the door to face the front element, wherein the first claw is mounted to the door to pivot about a first axis, such that the first claw is pivotable with respect to the door about the first axis; and a second claw pivotably mounted to the door to face the front element, wherein the second claw is mounted to the door to pivot about the first axis, such that the second claw is pivotable with respect to the door about the first axis, the second claw being spaced from the first claw, the first claw and the second claw being mounted to the door such that when the door is closed on the housing the claws engage a frontmost lid, and when the door is pivoted into an open position the claws extract said frontmost lid from the housing and dispense it for removal by a user.

2. The lid dispenser of claim 1 further comprising a spring extending between the door and the housing which urges the door to close on the housing.

3. The lid dispenser of claim 1 wherein the housing supports a stack of lids defining a lid axis, and wherein the first claw has portions defining portions of a first conical surface, the first conical surface having a conical axis which is parallel to the lid axis, and wherein when the door is closed on the housing, the first conical surface conical axis is above the lid axis, and when the door is pivoted into an opened position the first conical surface axis lies in a plane with the lid axis.

4. The lid dispenser of claim 3 wherein the second claw has portions which define a second conical surface having approximately the same conical axis as the first claw.

5. The dispenser of claim 1 wherein the claws are pivotable about the first axis between about 5° to about 25°.

6. The dispenser of claim 1 wherein each claw has a rear lip having a rear edge which engages against the frontmost lid, and wherein portions of the rear lip define one or more cut-aways which are relieved below the surface of the rear lip out of engagement with the frontmost lid.

7. An adjustable lid dispenser assembly comprising:

a housing having a front element with an opening therein through which lids are dispensed;

a plurality of pagers mounted to the housing to project frontwardly of the front element and to engage lids presented at the housing opening, each pager being fixed to one of a plurality of rods;

portions of the front element which extend outwardly from the front element opening and which define radially extending pager slots, each pager being radially positionable within a pager slot;

a plurality of alignment elements on the housing front element;

a door positioned frontwardly of the front element, and pivotably mounted to the housing, the door having a plurality of extraction claws mounted thereon, such that when the door is closed on the housing the claws engage a rim of a frontmost lid, and when the door is pivoted into an open position the claws extract said frontmost lid from the housing and dispense it for removal by a user;

a template having a plurality of alignment structures thereon, each alignment structure engaging with a corresponding alignment element on the housing front element to thereby position the template with respect to the housing, the template having rod set portions which extend radially outwardly to engage the plurality of rods, the pagers being movable within the pagers slots such that portions of the pager or the attached rod engages the rod portions; and releasable fasteners which engage the pagers for fastening of the rods in place in engagement against the template, such that the template is removable once the pagers and the attached rods are in a desired relationship to the housing for a particular lid to be dispensed from the housing.

8. A method for adjusting a lid dispenser to configure the lid dispenser to dispense lids of a given type, the method comprising the steps of:

removing two pivotably mounted first claws from a door of the lid dispenser, the door being pivotably mounted to a housing;

pivotably mounting two second claws to the door of the lid dispenser, the second claws being of different size and/or shape than the first claws;

adjusting fasteners which fix a plurality of pager rods to a housing front element to allow the pager rods to be movable radially within pager slots formed in the front element;

positioning a rigid template over the housing front element, such that portions of the template engage with portions of the housing front element to position rod portions of the template, and adjusting the pagers within the pager slots to engage the pagers or the rods with the rod portions of the template to position the pagers and rods in desired locations with respect to lids to be dispensed from the housing;

adjusting said fasteners to fix the pagers with respect to the housing; and removing the template from the housing.

9. A lid dispenser reconfiguration kit, for use with a lid dispenser having a housing with a front element with an opening therein through which lids are dispensed, a plurality of alignment elements being defined on the front element, and a plurality of radially adjustable pagers which extend out over the front element opening, and a door positioned frontwardly of the front element, and pivotably mounted to the housing; the kit comprising:

a template having a plurality of alignment structures thereon, each alignment structure for engaging with a corresponding alignment element on the housing front element to thereby position the template with respect to the housing, the template having set portions which extend radially outwardly to cause the adjustment of the position of the dispenser pagers; and two claws having mounting holes for pivotable mounting to the dispenser door.

10. The kit of claim 9, wherein the kit further comprises a cylindrical nose plate which is attachable to a piston assembly of the dispenser, rearwardly of the housing front element.

11. The kit of claim 9 wherein the template has three radially protruding alignment structures, and four radially protruding set portions.

12. The kit of claim 9 wherein each claw has a rear lip having a rear edge for engagement with a frontmost lid, and wherein portions of the rear lip define one or more cut-aways which are relieved below the surface of the rear lip out of engagement with the frontmost lid.

* * * * *